W. W. JACKSON.
DAMPER.
APPLICATION FILED APR. 15, 1915.
1,170,642.
Patented Feb. 8, 1916.
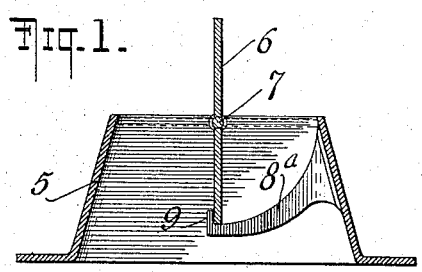
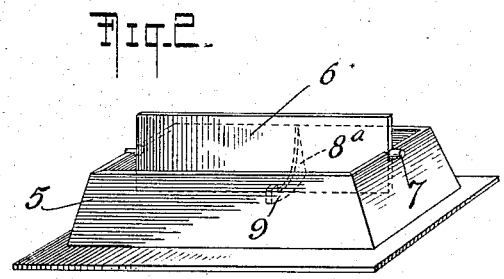
WITNESSES
INVENTOR
WILLIAM W. JACKSON
BY
ATTORNEYS

UNITED STATES PATENT OFFICE.

WILLIAM W. JACKSON, OF NEW YORK, N. Y.

DAMPER.

1,170,642. Specification of Letters Patent. Patented Feb. 8, 1916.

Application filed April 15, 1915. Serial No. 21,502.

*To all whom it may concern:*

Be it known that I, WILLIAM W. JACKSON, a citizen of the United States, resident of the borough of Brooklyn, county of Kings, city and State of New York, have invented certain new and useful Improvements in Dampers, of which the following is a specification.

My invention relates to dampers more particularly of the type adapted for use in connection with fire-places, stoves, stovepipes and the like and has for its object to provide an extremely simple arrangement whereby said damper may be efficiently held in any desired position.

My improvement will be fully described hereinafter and the features of novelty will be pointed out in the appended claims.

In the accompanying drawing which illustrates an example of my improvement Figure 1 is a transverse section showing my invention; and Fig. 2 is a perspective view thereof.

As illustrated in the drawing 5 represents a casing or passage open at opposite ends and preferably tapering upward, said casing being adapted to be incorporated in the throat of a chimney, for instance over a fire-place in the customary manner. A damper 6 is pivotally mounted in said casing 5 on trunnions 7 preferably arranged adjacent to the reduced open end thereof and is of such dimensions as to substantially close said end when in one of its positions.

The arrangement shown in Figs. 1 and 2 comprises a substantially rigid segment 8ª extending transversely to the axis of the damper 6, said segment being suitably secured in the casing 5 and having a surface curved about the trunnions 7 as a center as illustrated in Fig. 1. The said curved surface is adapted to frictionally engage the one edge of said damper 6 and serves to positively maintain the latter in any adjusted position. If desired, the segment 8ª may terminate in a stop 9 so located as to arrest the movement of said damper 6 in one direction when the latter is in its fully opened position.

It will be seen that my improvement provides a simple arrangement which positively maintains the damper in any desired position and permits a large variety of adjustments as well as a very fine degree of adjustment, the latter depending in no way on the coöperation of elements whereby a predetermined adjustment only is possible. The adjustment of the damper is also possible with a minimum of effort and said damper is capable of being easily moved substantially throughout its entire range of movement. Any desired means may be provided for actuating the damper, it being understood that my improvement may be utilized in combination with any type of damper adjustable in the arc of a circle. My arrangement may be readily combined with existing dampers and requires no special construction or complex manipulation.

Various changes in the forms shown and described may be made within the scope of the claims without departing from the spirit of my invention.

I claim:

1. The combination of an open-ended member, a damper pivotally mounted therein, and a segmental member extending transversely to the axis of said damper and having its one end rigidly secured to said element, said member having a friction surface arranged to be engaged throughout its length by an edge of said damper whereby the latter is maintained in an adjusted position.

2. The combination of an open-ended element, a damper pivotally mounted therein, a segmental member having its one end rigidly secured to said element and having a friction surface arranged to be engaged throughout its length by an edge of said damper whereby the latter is maintained in an adjusted position and a stop on said member whereby a movement of said damper in one direction is arrested.

In testimony whereof I have hereunto set my hand before two subscribing witnesses.

WILLIAM W. JACKSON.

Witnesses:
JOHN A. KEHLENBECK,
FRED A. KLEIN.

Copies of this patent may be obtained for five cents each, by addressing the "Commissioner of Patents, Washington, D. C."